US012718160B2

(12) United States Patent
Nagarajan et al.

(10) Patent No.: US 12,718,160 B2
(45) Date of Patent: Aug. 25, 2026

(54) SYSTEMS AND METHODS FOR PREDICTING A REQUIRED NUMBER OF OPENED POINT OF SALE (POS) STATIONS TO ACCOMMODATE A NUMBER OF CUSTOMERS

(71) Applicant: ZEBRA TECHNOLOGIES CORPORATION, Lincolnshire, IL (US)

(72) Inventors: Karthikeyan Nagarajan, Chennai (IN); Alessandro Bay, London (GB); Anil Ozdemir, Sheffield (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 48 days.

(21) Appl. No.: 18/072,194

(22) Filed: Nov. 30, 2022

(65) Prior Publication Data

US 2024/0177089 A1 May 30, 2024

(51) Int. Cl.

*G06Q 10/0631* (2023.01)
*G06N 3/0464* (2023.01)
*G06N 3/08* (2023.01)

(52) U.S. Cl.

CPC ..... *G06Q 10/06315* (2013.01); *G06N 3/0464* (2023.01); *G06N 3/08* (2013.01)

(58) Field of Classification Search

CPC ... G06Q 10/06315; G06N 3/0464; G06N 3/08
See application file for complete search history.

(56) References Cited

U.S. PATENT DOCUMENTS

| | | | | |
|---|---|---|---|---|
| 6,831,663 B2 * | 12/2004 | Chickering | G06Q 10/02 | 707/999.102 |
| 2009/0249342 A1 * | 10/2009 | Johnson | G06Q 10/04 | 718/101 |
| 2012/0191531 A1 * | 7/2012 | You | G06F 16/958 | 705/14.42 |
| 2017/0068969 A1 * | 3/2017 | Arai | G06Q 20/202 | |
| 2018/0075427 A1 * | 3/2018 | Greenberger | G06Q 20/389 | |

(Continued)

OTHER PUBLICATIONS

Sobeys pilots Smart Cart, the first intelligent grocery shopping cart. Canada NewsWire [Ottawa] Oct. 23, 2019.*

(Continued)

*Primary Examiner* — Timothy Padot

(57) ABSTRACT

Systems and methods for method for predicting a required number of point of sale (POS) stations to accommodate a number of customers are disclosed herein. An example method includes analyzing image data to determine (i) a set of customer data and (ii) a cart occupancy value associated with the customers, and generating, utilizing a machine learning (ML) algorithm, a first value based on the set of customer data and the cart occupancy value associated with the customers. The ML algorithm may be trained using a plurality of training data including a plurality of training customer data and a plurality of training cart occupancy values. The example method further includes determining whether the first value exceeds a second value, and responsive to determining that the first value exceeds the second value, generating an alert for transmission to a device indicating that the first value exceeds the second value.

20 Claims, 6 Drawing Sheets

(56) References Cited

U.S. PATENT DOCUMENTS

| | | | | |
|---|---|---|---|---|
| 2019/0180376 | A1* | 6/2019 | Huang | G06Q 40/06 |
| 2019/0385173 | A1* | 12/2019 | Johnsen | G06V 20/52 |
| 2021/0097461 | A1* | 4/2021 | Baughman | G06V 20/52 |
| 2021/0233005 | A1* | 7/2021 | Hoang | G06Q 10/06315 |
| 2021/0409894 | A1* | 12/2021 | Begleiter | G06N 3/09 |
| 2022/0237626 | A1* | 7/2022 | White, Jr. | G06N 20/00 |

OTHER PUBLICATIONS

Waiting for Smart Carts: Self-checkout shopping baskets will be more than just a convenience. They will encourage buying. BT. Business Today Living Media India, Limited. (Feb. 24, 2019).*

D. A. Mora Hernandez, O. Nalbach and D. Werth, "How Computer Vision Provides Physical Retail with a Better View on Customers,"2019 IEEE 21st Conference on Business Informatics (CBI), Moscow, Russia, 2019, pp. 462-471.*

P. L. Venetianer, Z. Zhang, A. Scanlon, Y. Hu and A. J. Lipton, "Video verification of point of sale transactions," 2007 IEEE Conference on Advanced Video and Signal Based Surveillance, London, UK, 2007, pp. 411-416.*

* cited by examiner

SYSTEMS AND METHODS FOR PREDICTING A REQUIRED NUMBER OF OPENED POINT OF SALE (POS) STATIONS TO ACCOMMODATE A NUMBER OF CUSTOMERS

BACKGROUND

Typically, checkout aisles or point of sale (POS) stations are managed (e.g., opened or closed) on a reactive basis. Store managers and other employees may manually inspect/estimate customer numbers within a store, and may correspondingly estimate a number POS stations required to accommodate checkout for those customers in a reasonable amount of time. More commonly, managers may observe a long queue of customers waiting to be checked out at an insufficient number of opened POS stations, and may open additional POS stations to accommodate the excess customers.

However, this manual evaluation of POS station capacity and related customer numbers suffers from several drawbacks. For example, customer numbers may vary significantly throughout a day, and at times, customer inflow to a store is high enough to overwhelm the currently operating POS stations. Consequently, customers are forced to wait in long lines at checkout, which in many cases can lead to customers abandoning their shopping efforts while in the store. These issues are further exasperated by conventional methods because, even once managers determine that additional POS stations should be opened, opening the additional POS stations takes time. As a result, customers are forced to wait in long lines while additional POS stations are opened.

Thus, there is a need for systems and methods for predicting a required number of opened POS stations to quickly, efficiently, and accurately accommodate a number of customers.

SUMMARY

In an embodiment, the present invention is a method for predicting a required number of point of sale (POS) stations to accommodate a number of customers. The method may comprise: analyzing, by one or more processors, image data to determine (i) a set of customer data and (ii) a cart occupancy value associated with the customers; generating, utilizing a machine learning (ML) algorithm, a first value based on the set of customer data and the cart occupancy value associated with the customers, the ML algorithm being trained using a plurality of training data including a plurality of training customer data and a plurality of training cart occupancy values; determining, by the one or more processors, whether the first value exceeds a second value; and responsive to determining that the first value exceeds the second value, generating, by the one or more processors, an alert for transmission to a device indicating that the first value exceeds the second value.

In a variation of this embodiment, analyzing the image data further comprises: executing, by the one or more processors, a machine vision algorithm configured to generate a visual embedding and a customer identification value corresponding to each customer; and storing, by the one or more processors, the visual embedding and the customer identification value for each customer in a database. Further in this variation, the method may further comprise: generating, by the one or more processors, the visual embedding and the customer identification value for a respective customer at a first time; updating, by the one or more processors, the cart occupancy value for the respective customer at a second time that is different from the first time; and deleting, by the one or more processors, the visual embedding and the customer identification value for a respective customer at a third time, wherein the respective customer does not appear in subsequent image data at the third time, and the third time exceeds a threshold value relative to the second time. Still further in this variation, the method may comprise: determining, by the one or more processors, an association between a respective customer and a corresponding cart based on (i) the visual embedding and (ii) a physical proximity value of the respective customer and the corresponding cart. Yet further in this variation, the one or more processors may generate the visual embedding and the customer identification value for a respective customer at a first time, and the method may further comprise: detecting, by the one or more processors, the respective customer within subsequent image data at a second time that is different from the first time; verifying, by the one or more processors, that the visual embedding and the customer identification value for the respective customer are stored in the database; and updating, by the one or more processors, the cart occupancy value for the respective customer.

In another variation of this embodiment, the method further comprises: training, by the one or more processors, the ML model using the plurality of training data including (i) the plurality of training customer data, (ii) the plurality of training cart occupancy values, and (iii) a plurality of training POS capacity values; and generating, utilizing the ML model, the first value based on (i) the set of customer data, (ii) the cart occupancy value associated with the customers, and (iii) a POS capacity value.

In yet another variation of this embodiment, the method further comprises: training, by the one or more processors, the ML model using the plurality of training data including (i) the plurality of training customer data, (ii) the plurality of training cart occupancy values, and (iii) a plurality of training customer checkout values; and generating, utilizing the ML model, the first value based on (i) the set of customer data, (ii) the cart occupancy value associated with the customers, and (iii) a customer checkout value.

In still another variation of this embodiment, the method further comprises: responsive to determining that the first value does not exceed the second value, generating, by the one or more processors, an alert for transmission to the device indicating that the first value does not exceed the second value.

In yet another variation of this embodiment, the ML algorithm is a neural network (NN), such as a convolutional neural network (CNN), and the set of customer data may include: (i) a customer number, (ii) customer age values, and/or (iii) a customer ability value.

In another embodiment, the present invention is a system for predicting a required number of point of sale (POS) stations to accommodate a number of customers. The system may comprise: at least one processor; and a memory storing instructions that, when executed by the at least one processor, cause the at least one processor to: analyze image data to determine (i) a set of customer data and (ii) a cart occupancy value associated with the customers, generate, utilizing a machine learning (ML) algorithm, a first value based on the set of customer data and the cart occupancy value associated with the customers, the ML algorithm being trained using a plurality of training data including a plurality of training customer data and a plurality of training cart occupancy values, determine whether the first value exceeds a second value, and responsive to determining that the first value exceeds the second value, generate an alert for transmission to a device indicating that the first value exceeds the second value.

In a variation of this embodiment, the instructions, when executed, may further cause the at least one processor to analyze the image data by: executing a machine vision algorithm configured to generate a visual embedding and a customer identification value corresponding to each customer, and storing the visual embedding and the customer identification value for each customer in a database. Further in this variation, the instructions, when executed, may further cause the at least one processor to: generate the visual embedding and the customer identification value for a respective customer at a first time, update the cart occupancy value for the respective customer at a second time that is different from the first time, and delete the visual embedding and the customer identification value for a respective customer at a third time, wherein the respective customer does not appear in subsequent image data at the third time, and the third time exceeds a threshold value relative to the second time. Still further in this variation, the instructions, when executed, may further cause the at least one processor to: determine an association between a respective customer and a corresponding cart based on (i) the visual embedding and (ii) a physical proximity value of the respective customer and the corresponding cart. Yet further in this variation, the instructions, when executed, may further cause the at least one processor to: generate the visual embedding and the customer identification value for a respective customer at a first time, detect the respective customer within subsequent image data at a second time that is different from the first time, verify that the visual embedding and the customer identification value for the respective customer are stored in the database, and update the cart occupancy value for the respective customer.

In another variation of this embodiment, the instructions, when executed, may further cause the at least one processor to: train the ML model using the plurality of training data including (i) the plurality of training customer data, (ii) the plurality of training cart occupancy values, and (iii) a plurality of training POS capacity values, and generate, utilizing the ML model, the first value based on (i) the set of customer data, (ii) the cart occupancy value associated with the customers, and (iii) a POS capacity value.

In yet another variation of this embodiment, the instructions, when executed, may further cause the at least one processor to: train the ML model using the plurality of training data including (i) the plurality of training customer data, (ii) the plurality of training cart occupancy values, and (iii) a plurality of training customer checkout values, and generate, utilizing the ML model, the first value based on (i) the set of customer data, (ii) the cart occupancy value associated with the customers, and (iii) a customer checkout value.

In still another variation of this embodiment, the instructions, when executed, may further cause the at least one processor to: responsive to determining that the first value does not exceed the second value, generate an alert for transmission to the device indicating that the first value does not exceed the second value.

In yet another embodiment, the present invention is a tangible machine-readable medium comprising instructions for predicting a required number of point of sale (POS) stations to accommodate a number of customers that, when executed, may cause a machine to at least: analyze image data to determine (i) a set of customer data and (ii) a cart occupancy value associated with the customers; generate, utilizing a machine learning (ML) algorithm, a first value based on the set of customer data and the cart occupancy value associated with the customers, the ML algorithm being trained using a plurality of training data including a plurality of training customer data and a plurality of training cart occupancy values; determine whether the first value exceeds a second value; and responsive to determining that the first value exceeds the second value, generate an alert for transmission to a device indicating that the first value exceeds the second value.

In a variation of this embodiment, the instructions, when executed, may further cause the machine to analyze the image data by: executing a machine vision algorithm configured to generate a visual embedding and a customer identification value corresponding to each customer; and storing the visual embedding and the customer identification value for each customer in a database.

In another variation of this embodiment, the instructions, when executed, may further cause the machine to: generate the visual embedding and the customer identification value for a respective customer at a first time; update the cart occupancy value for the respective customer at a second time that is different from the first time; and delete the visual embedding and the customer identification value for a respective customer at a third time, wherein the respective customer does not appear in subsequent image data at the third time, and the third time exceeds a threshold value relative to the second time.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
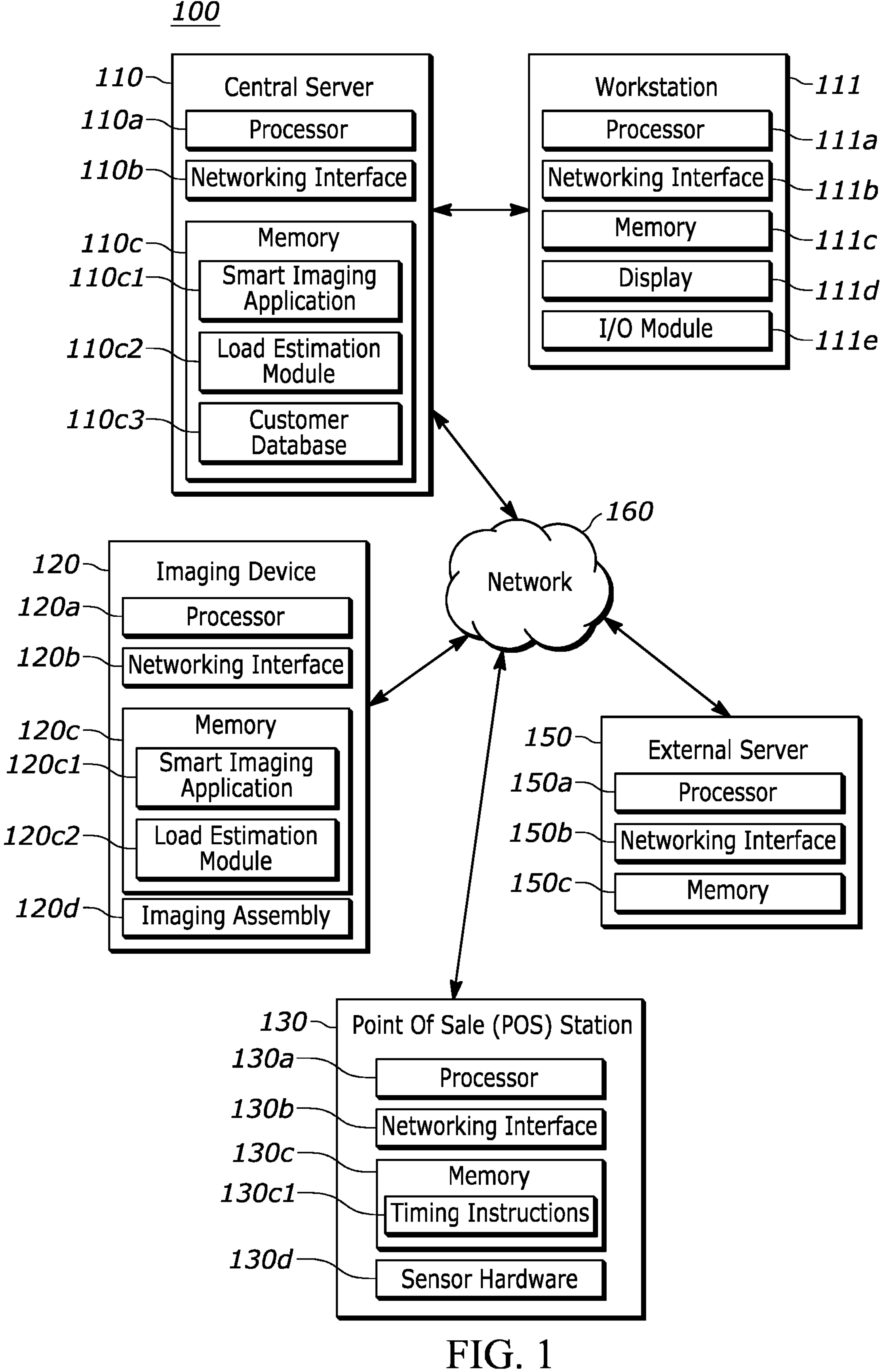
FIG. 1 is an example computing system for predicting a required number of opened POS stations to accommodate a number of customers, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, conventional techniques for evaluating POS station capacity and related customer numbers suffers from several drawbacks. For example, customer numbers may vary significantly throughout a day, and at times, customer inflow to a store is high enough to overwhelm the currently operating POS stations. Consequently, customers are forced to wait in long lines at checkout, which in many cases can lead to customers abandoning their shopping efforts while in the store. These issues are further exasperated by conventional techniques because, even once managers determine that additional POS stations should be opened, opening the additional POS stations takes time. As a result, customers are forced to wait in long lines while additional POS stations are opened.

Thus, it is an objective of the present disclosure to eliminate these and other problems with such conventional techniques by predicting a required number of opened POS stations necessary to accommodate customers on a real-time basis through machine learning (ML) algorithms. The systems and methods of the present disclosure thereby provide more accurate and efficient POS station capacity evaluation than conventional techniques. As described herein, the embodiments of the present disclosure may significantly reduce customer queue lengths, speed up checkout times for individual customers at POS stations, and generally ensure that available POS stations and employees are utilized efficiently and accurately to accommodate variations in customer numbers throughout each day.

In accordance with the above, and with the disclosure herein, the present disclosure includes improvements in computer functionality or in improvements to other technologies at least because the present disclosure describes that, e.g., monitoring systems, and their related various components, may be improved or enhanced with the disclosed methods and systems that provide accurate and efficient estimations regarding POS station capacity for respective users and administrators. That is, the present disclosure describes improvements in the functioning of a monitoring system itself or “any other technology or technical field” (e.g., the field of location monitoring systems) because the disclosed methods and systems improve and enhance operation of monitoring systems by introducing improved customer identification/tracking, cart occupancy tracking, and POS station capacity estimation that reduce and/or eliminate many inefficiencies typically experienced over time by monitoring systems lacking such methods and systems. This improves the state of the art at least because such previous monitoring systems are inefficient and inaccurate, as they lack the ability for such customer identification/tracking, cart occupancy tracking, and POS station capacity estimation.

In addition, the present disclosure includes applying various features and functionality, as described herein, with, or by use of, a particular machine, e.g., an imaging device, a POS station, a central server, a workstation, and/or other hardware components as described herein.

Moreover, the present disclosure includes specific features other than what is well-understood, routine, conventional activity in the field, or adding unconventional steps that demonstrate, in various embodiments, particular useful applications, e.g., analyzing, by one or more processors, image data to determine (i) a set of customer data and (ii) a cart occupancy value associated with the customers; and/or generating, utilizing a machine learning (ML) algorithm, a first value based on the set of customer data and the cart occupancy value associated with the customers, the ML algorithm being trained using a plurality of training data including a plurality of training customer data and a plurality of training cart occupancy values.

Turning to the Figures, FIG. 1 is an example computing system 100 for predicting a required number of opened POS stations to accommodate a number of customers, in accordance with embodiments described herein. Depending on the embodiment, the example computing system 100 may calculate/determine/generate a set of customer data, a cart occupancy value, a visual embedding, a customer identification (ID) value, an alert signal, associations between customers and carts, and/or any other values or combinations thereof. Of course, it should be appreciated that, while the various components of the example computing system 100 (e.g., central server 110, workstation 111, imaging device 120, POS station 130, external server 150, etc.) are illustrated in FIG. 1 as single components, the example computing system 100 may include multiple (e.g., dozens, hundreds, thousands) of each of the components that are simultaneously connected to the network 160 at any given time.

Generally, the example computing system 100 may include a central server 110, a workstation 111, an imaging device 120, a POS station 130, and an external server 150. The central server 110 may generally receive data from the imaging device 120 corresponding to customers, carts, and/or other objects located within a store (e.g., a grocery store) or other suitable location, and may process the data in accordance with one or more sets of instructions contained in the memory 110*c* to output any of the values previously described. The central server 110 may include one or more processors 110*a*, a networking interface 110*b*, and a memory 110*c*. The memory 110*c* may include various sets of executable instructions that are configured to analyze data received at the central server 110 and analyze that data to output various values. These executable instructions include, for example, a smart imaging application 110*c*1, a load estimation module 110*c*2, and instructions for accessing a customer database 110*c*3.

More specifically, the central server 110 may be configured to receive and/or otherwise access data from various devices (e.g., imaging device 120, POS station 130), and may utilize the processor(s) 110*a* to execute the instructions stored in the memory 110*c* to analyze and/or otherwise process the received data. As an example, the central server 110 may receive image data from the imaging device 120 that features (1) a customer that has recently entered a store location and (2) a cart corresponding to the customer. The central server 110 may utilize the processor(s) 110*a* to check the customer database 110*c*3 and verify that the customer does not have an associated customer ID value in the database 110*c*3. Accordingly, the central server 110 may utilize the processor(s) 110*a* to execute the smart imaging application 110*c*1 and generate a visual embedding and a customer ID value for the customer featured in the image data. This visual embedding and the customer ID value may then be stored in the customer database 110*c*3 for future reference by the processor(s) 110*a* when the customer re-appears in image data captured by the imaging device 120.

As another example, the central server 110 may receive image data from the imaging device 120, and the processor(s) 110*a* may check the customer database 110*c*3 to determine (i) a set of customer data (e.g., customer ID values, customer age values, customer ability values), and/or execute the smart imaging application 110*c*1 to determine (ii) a cart occupancy value associated with each customer represented in the image data. The central server 110 may then execute the load estimation module 110*c*2 to generate a first value based on the set of customer data and the cart occupancy value associated with each customer represented in the image data. For example, the first value may be or include an estimated/predicted POS station capacity value, an estimated/predicted customer checkout time, and/or any other suitable values or combinations thereof.

The imaging device 120 may include one or more processors 120*a*, a networking interface 120*b*, one or more memories 120*c*, an imaging assembly 120*d*, the smart imaging application 120*c*1, and the load estimation module 120*c*2. The imaging assembly 120*d* may include a digital camera and/or digital video camera for capturing or taking digital images and/or frames. Each digital image may comprise pixel data that may be analyzed in accordance with instructions comprising the smart imaging application 120*c*1 and/or the load estimation module 120*c*2, as executed by the one or more processors 120*a*, as described herein. The digital camera and/or digital video camera of, e.g., the imaging assembly 120*d* may be configured to take, capture, or otherwise generate digital images and, at least in some embodiments, may store such images in a memory (e.g., one or more memories 110*c*, 120*c*) of a respective device (e.g., central server 110, imaging device 120).

For example, the imaging assembly 120*d* may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 120*d* may capture 2D images, and related 2D image data, at the same or similar point in time as the 3D camera of the imaging assembly 120*d* such that the imaging device 120 can have both sets of 3D image data and 2D image data available for a particular surface, object, area, or scene at the same or similar instance in time. In various embodiments, the imaging assembly 120*d* may include the 3D camera and the photo-realistic camera as a single imaging apparatus configured to capture 3D depth image data simultaneously with 2D image data. As such, the captured 2D images and the corresponding 2D image data may be depth-aligned with the 3D images and 3D image data.

The imaging device 120 may also process the 2D image data/datasets and/or 3D image datasets for use by other devices (e.g., the central server 110, the workstation 111). For example, the one or more processors 120*a* may process the image data or datasets captured, scanned, or sensed by the imaging assembly 120*d*. The processing of the image data may generate post-imaging data that may include metadata, simplified data, normalized data, result data, status data, or alert data as determined from the original scanned or sensed image data. The image data and/or the post-imaging data may be sent to the central server 110 executing, for example, the smart imaging application 110*c*1 and/or the load estimation module 110*c*2 for viewing, manipulation, and/or otherwise interaction. In other embodiments, the image data and/or the post-imaging data may be sent to a server (e.g., central server 110) for storage or for further manipulation. As described herein, the central server 110, imaging device 120, and/or external server or other centralized processing unit and/or storage may store such data, and may also send the image data and/or the post-imaging data to another application implemented on a user device, such as a mobile device, a tablet, a handheld device, or a desktop device.

Moreover, it should be understood that, in certain embodiments, the workstation 111, the imaging device 120, the POS station 130, and/or the external server 150 may perform any/all of the calculations, determinations, and/or other actions described herein in reference to the central server 110. For example, the imaging device 120 may be configured to execute machine vision tasks and machine vision jobs that perform one or more of the actions described herein. Namely, the imaging device 120 may obtain a job file containing one or more job scripts from the central server 110 (or other suitable source) across the network 160 that may define the machine vision job and may configure the imaging device 120 to capture and/or analyze images in accordance with the machine vision job. The imaging device 120 may include flash memory used for determining, storing, or otherwise processing imaging data/datasets and/or post-imaging data.

The imaging device 120 may then receive, recognize, and/or otherwise interpret a trigger that causes the imaging device 120 to capture an image of the target object or capture multiple images (or video) of multiple target objects (e.g., customers and carts in a store) in accordance with the configuration established via the one or more job scripts. Once captured and/or analyzed, the imaging device 120 may transmit the images and any associated data across the network 160 to the central server 110 for further analysis and/or storage. Additionally, or alternatively, the imaging device 120 may be a "smart" camera and/or may otherwise be configured to automatically perform sufficient functionality of the imaging device 120 to obtain, interpret, and execute job scripts that define machine vision jobs, such as any one or more job scripts contained in one or more job files as obtained, for example, from the central server 110.

In addition, the imaging device 120 may include a networking interface 120*b* that enables connectivity to a computer network (e.g., network 160). For example, the networking interface 120*b* may allow the imaging device 120 to connect to a network, such as a Gigabit Ethernet connection and/or a Dual Gigabit Ethernet connection. Further, the imaging device 120 may include transceivers and/or other communication components as part of the networking interface 120*b* to communicate with other devices (e.g., the central server 110) via, for example, Ethernet/IP, PROFINET, Modbus TCP, CC-Link, USB 3.0, RS-232, and/or any other suitable communication protocol or combinations thereof.

Regardless, to execute these or other instructions stored in memory 110*c*, the central server 110 may communicate with a workstation 111. The workstation 111 may generally be any computing device that is communicatively coupled with the central server 110, and more particularly, may be a computing device with administrative permissions that enable a user accessing the workstation 111 to update and/or otherwise change data/models/applications that are stored in the memory 110*c*. The workstation 111 may also be generally configured to enable a user/operator to, for example, create and upload a machine vision job for execution and/or otherwise interact with the imaging device 120. The user/operator may transmit/upload any configuration adjustment, software updates, and/or any other suitable information to the imaging device 120 via the network 160, where the information is then interpreted and processed accordingly.

For example, the workstation 111 may enable a user to access the central server 110, and the user may train models that are included as part of the smart imaging application 110*c*1 and/or the load estimation module 110*c*2 that are stored in the memory 110*c*. The workstation 111 may include one or more processors 111*a*, a networking interface 111*b*, a memory 111*c*, a display 111*d*, and an input/output (I/O) module 111*e*. Generally, the smart imaging application 110*c*1, 120*c*1 may include and/or otherwise comprise executable instructions (e.g., via the one or more processors 110*a*, 120*a*) that allow a user to configure a machine vision job and/or imaging settings of the imaging device 120. For example, the smart imaging application 110*c*1, 120*c*1 may render a graphical user interface (GUI) on a display 111*d* of the workstation 111, and the user may interact with the GUI to change various settings, modify machine vision jobs, input data, etc. Moreover, the smart imaging application 110*c*1, 120*c*1 may output results of the executed machine vision job for display to the user, and the user may again interact with the GUI to approve the results, modify imaging settings to re-perform the machine vision job, and/or any other suitable input or combinations thereof.

In certain embodiments, the smart imaging application 110*c*1, 120*c*1 may also include and/or otherwise comprise executable instructions (e.g., via the one or more processors 110*a*, 120*a*) that generate visual embeddings and/or customer ID values based on images captured by the imaging device 120. The smart imaging application 110*c*1, 120*c*1 may also train models to perform these generations. For example, image data captured by the imaging device 120 may include customers within a store and carts disposed proximate to the customers. The one or more processors 110*a*, 120*a* may execute a trained image analysis model, which is a part of the smart imaging application 110*c*1, 120*c*1, to generate visual embeddings and/or customer ID values.

The load estimation module 110*c*2, 120*c*2 may include and/or otherwise comprise executable instructions (e.g., via the one or more processors 110*a*, 120*a*) that estimate a customer load (e.g., an estimated POS station capacity value) and/or a customer checkout time based on images captured by the imaging device 120. The load estimation module 110*c*2, 120*c*2 may also train models to perform these estimations. For example, image data captured by the imaging device 120 may include customers within a store and carts disposed proximate to the customers. The one or more processors 110*a*, 120*a* may execute a trained load estimation model, which is a part of the load estimation module 110*c*2, 120*c*2, to estimate the customer load and/or the customer checkout time.

As discussed herein, in certain embodiments, one or more of the models that are included as part of the smart imaging application 110*c*1 and/or the load estimation module 110*c*2 may be trained by and may implement machine learning (ML) techniques. In these embodiments, the user accessing the workstation 111 may upload training data, execute training sequences to train the models, and/or may update/re-train the models over time.

Of course, in certain embodiments, any of the models that are included as part of the smart imaging application 110*c*1 and/or the load estimation module 110*c*2 may be a rules-based algorithm configured to receive sets of customer data, cart occupancy values, image data, customer checkout values, and/or POS capacity values as an input and to output visual embeddings, customer ID values, estimated POS station capacity values, and/or estimated customer checkout times.

In some embodiments, the central server 110 may store and execute instructions that may generally train the various models that are included as part of the smart imaging application 110*c*1 and/or the load estimation module 110*c*2 and stored in the memory 110*c*. For example, the central server 110 may execute instructions that are configured to utilize training dataset(s) to train models that are included as part of the smart imaging application 110*c*1 to output visual embeddings and/or customer ID values, and/or train models that are included as part of the load estimation module 110*c*2 to output estimated POS station capacity values and/or estimated customer checkout times. In particular, the training dataset(s) may include a plurality of training customer number values and a plurality of training cart occupancy values, a plurality of training POS capacity values, a plurality of training customer checkout values, and/or any other suitable data and combinations thereof.

Generally, ML techniques have been developed that allow parametric or nonparametric statistical analysis of large quantities of data. Such ML techniques may be used to automatically identify relevant variables (e.g., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. More specifically, a processor or a processing element may be trained using supervised or unsupervised ML.

In supervised machine learning, a machine learning program operating on a server, computing device, or otherwise processors, may be provided with example inputs (e.g., "features") and their associated, or observed, outputs (e.g., "labels") for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided to subsequent inputs for the model, executing on a server, computing device, or otherwise processors as described herein, to predict or classify, based upon the discovered rules, relationships, or model, an expected output, score, or value.

In unsupervised machine learning, the server, computing device, or otherwise processors, may be required to find its own structure in unlabeled example inputs, where, for example multiple training iterations are executed by the server, computing device, or otherwise processors to train multiple generations of models until a satisfactory model, e.g., a model that provides sufficient prediction accuracy when given test level or production level data or inputs, is generated.

Exemplary ML programs/algorithms that may be utilized by the central server 110 to train the models that are included as part of the smart imaging application 110*c*1 and/or the load estimation module 110c2 may include, without limitation: neural networks (NN) (e.g., convolutional neural networks (CNN), deep learning neural networks (DNN), combined learning module or program), linear regression, logistic regression, decision trees, support vector machines (SVM), naïve Bayes algorithms, k-nearest neighbor (KNN) algorithms, random forest algorithms, gradient boosting algorithms, Bayesian program learning (BPL), voice recognition and synthesis algorithms, image or object recognition, optical character recognition (OCR), natural language understanding (NLU), and/or other ML programs/algorithms either individually or in combination.

After training, ML programs (or information generated by such ML programs) may be used to evaluate additional data. Such data may be and/or may be related to image data, sets of customer data, cart occupancy values, image data, customer checkout values, POS capacity values, and/or other data that was not included in the training dataset. The trained ML programs (or programs utilizing models, parameters, or other data produced through the training process) may accordingly be used for determining, assessing, analyzing, predicting, estimating, evaluating, or otherwise processing new data not included in the training dataset. Such trained ML programs may, therefore, be used to perform part or all of the analytical functions of the methods described elsewhere herein.

It is to be understood that supervised ML and/or unsupervised ML may also comprise retraining, relearning, or otherwise updating models with new, or different, information, which may include information received, ingested, generated, or otherwise used over time. The disclosures herein may use one or more of such supervised and/or unsupervised ML techniques. Further, it should be appreciated that, as previously mentioned, the models that are included as part of the smart imaging application 110c1 and/or the load estimation module 110c2 may be used to output visual embeddings, customer ID values, estimated POS station capacity values, and/or estimated customer checkout times, using artificial intelligence (e.g., a ML model of the smart imaging application 110c1 and/or the load estimation module 110c2) or, in alternative aspects, without using artificial intelligence.

Moreover, although the methods described elsewhere herein may not directly mention ML techniques, such methods may be read to include such ML for any determination or processing of data that may be accomplished using such techniques. In some aspects, such ML techniques may be implemented automatically upon occurrence of certain events or upon certain conditions being met. In any event, use of ML techniques, as described herein, may begin with training a ML program, or such techniques may begin with a previously trained ML program.

When the models that are included as part of the smart imaging application 110c1 and/or the load estimation module 110c2 determine that a first value (e.g., include an estimated/predicted POS station capacity value, an estimated/predicted customer checkout time) exceeds a second value (e.g., current POS station capacity, customer queue length/checkout time threshold), the central server 110 may generate an alert signal that indicates the first value exceeds the second value. For example, the models that are included as part of the smart imaging application 110c1 and/or the load estimation module 110c2 determine an estimated POS station capacity value of five. In this example, the central server 110 may compare this estimated POS station capacity value (five) to a current POS station capacity value of three and determine that the estimated POS station capacity value exceeds the current POS station capacity value. Accordingly, the central server 110 may generate an alert signal indicating that the estimated POS station capacity value exceeds the current POS station capacity value by two, and may further recommend opening at least two additional POS stations to accommodate the current customer levels.

The central server 110 may then transmit the alert signal to a workstation 111 and/or other suitable device for display to a user (e.g., store manager). Moreover, in certain embodiments, the central server 110 may also transmit the alert signal to the POS station 130 to signal store employees to potentially open additional POS stations. Such alert signal may be or include a phone call, an email, a text message, an alphanumeric message presented on a POS station display, a flashing light, an audible sound/alarm, a haptic signal, and/or any other signal transmitted across any suitable communication medium.

Regardless, the central server 110 may transmit the outputs of any models that are included as part of the smart imaging application 110c1 and/or the load estimation module 110c2 and/or other instructions executed by the processor(s) 110a to the workstation 111 and/or the POS station 130 that is operated by a user/employee/manager associated with a store. The user may then view the workstation 111 and/or the POS station 130 to determine how to proceed with opening and/or closing POS stations, as indicated in the alert(s) transmitted by the central server 110. For example, the central server 110 may transmit an alert to the workstation 111 indicating that the current POS station capacity value exceeds the estimated POS station capacity value by one. The user may view this alert on the workstation 111, and may proceed with shutting down one of the currently open POS stations 130, and reassigning the employee(s) operating the POS station to perform other work.

The POS station 130 may generally include a processor 130a, a networking interface 130b, a memory 130c storing timing instructions 130c1, and sensor hardware 130d. The sensor hardware 130d may generally be or include any suitable hardware for scanning items for purchase, tracking customer movement at the POS station 130, and/or any other suitable hardware or combinations thereof. The timing instructions 130c1 may include computer-executable instructions that cause the processor 130a to determine a total checkout time for each individual customer at the POS station 130. For example, the timing instructions 130c1 may cause the processor 130a to initiate a timer when a new billing sequence (e.g., set of purchasable items) is initiated at the POS station 130. When a customer successfully pays for the items to indicate the end of the new billing sequence, the timing instructions 130c1 may cause the processor 130a to terminate the timer, and transmit the time recorded by the timer to the central server 110 and/or other suitable processing device for analysis (e.g., by models of the load estimation module 120c2).

The external server 150 may be or include computing servers and/or combinations of multiple servers storing data that may be accessed/retrieved by the central server 110, the workstation 111, the user imaging device 120, and/or the POS station 130. The data stored by the external server 150 may include customer data, for example, as stored in the customer database 110c3. Generally, the data or other information stored in the memory 150c may be accessed, retrieved, and/or otherwise received by the central server 110, and may be utilized by the models that are included as part of the smart imaging application 110c1 and/or the load estimation module 110c2 to generate the outputs of those models. The external server 150 may include a processor 150*a*, a networking interface 150*b*, and a memory 150*c*.

The central server 110 may be communicatively coupled to the workstation 111, the imaging device 120, the POS station 130, and/or the external server 150. For example, the central server 110, the workstation 111, the imaging device 120, the POS station 130, and/or the external server 150 may communicate via USB, Bluetooth, Wi-Fi Direct, Near Field Communication (NFC), etc. For example, the central server 110 may transmit an alert to the workstation 111 and/or the POS station 130 via the networking interface 110*b*, which the workstation 111 and/or the POS station 130 may receive via the respective networking interface 111*b*, 130*b*.

Each of the one or more memories 110*c*, 111*c*, 120*c*, 130*c*, 150*c* may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 110*c*1, 120*c*1, load estimation module 110*c*2, 120*c*2, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 110*a*, 111*a*, 120*a*, 130*a*, 150*a* (e.g., working in connection with the respective operating system in the one or more memories 110*c*, 111*c*, 120*c*, 130*c*, 150*c*) to facilitate, implement, and/or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110*c*, 111*c*, 120*c*, 130*c*, 150*c* may store an operating system (OS) (e.g., Microsoft Windows, Linux, Unix, etc.) capable of facilitating the functionalities, apps, methods, or other software as discussed herein. The one or more memories 110*c*, 111*c*, 120*c*, 130*c*, 150*c* may also store the smart imaging application 110*c*1, 120*c*1 and/or the load estimation module 110*c*2, 120*c*2. The one or more memories 110*c*, 111*c*, 120*c*, 130*c*, 150*c* may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision and/or machine learning based imaging application, such as the smart imaging application 110*c*1, 120*c*1 and/or the load estimation module 110*c*2, 120*c*2, where each may be configured to facilitate their various functionalities discussed herein. It should be appreciated that one or more other applications may be envisioned and are executed by the one or more processors 110*a*, 111*a*, 120*a*, 130*a*, 150*a*.

The one or more processors 110*a*, 111*a*, 120*a*, 130*a*, 150*a* may be connected to the one or more memories 110*c*, 111*c*, 120*c*, 130*c*, 150*c* via a computer bus responsible for transmitting electronic data, data packets, or otherwise electronic signals to and from the one or more processors 110*a*, 111*a*, 120*a*, 130*a*, 150*a* and one or more memories 110*c*, 111*c*, 120*c*, 130*c*, 150*c* to implement or perform the machine readable instructions, methods, processes, elements or limitations, as illustrated, depicted, or described for the various flowcharts, illustrations, diagrams, figures, and/or other disclosure herein.

The one or more processors 110*a*, 111*a*, 120*a*, 130*a*, 150*a* may interface with the one or more memories 110*c*, 111*c*, 120*c*, 130*c*, 150*c* via the computer bus to execute the operating system (OS). The one or more processors 110*a*, 111*a*, 120*a*, 130*a*, 150*a* may also interface with the one or more memories 110*c*, 111*c*, 120*c*, 130*c*, 150*c* via the computer bus to create, read, update, delete, or otherwise access or interact with the data stored in the one or more memories 110*c*, 111*c*, 120*c*, 130*c*, 150*c* and/or external databases (e.g., a relational database, such as Oracle, DB2, MySQL, or a NoSQL based database, such as MongoDB). The data stored in the one or more memories 110*c*, 111*c*, 120*c*, 130*c*, 150*c* and/or an external database may include all or part of any of the data or information described herein, including, for example, the customer database 110*c*3 and/or other suitable information.

The networking interfaces 110*b*, 111*b*, 120*b*, 130*b*, 150*b* may be configured to communicate (e.g., send and receive) data via one or more external/network port(s) to one or more networks or local terminals, such as network 160, described herein. In some embodiments, the networking interfaces 110*b*, 111*b*, 120*b*, 130*b*, 150*b* may include a client-server platform technology such as ASP.NET, Java J2EE, Ruby on Rails, Node.js, a web service or online API, responsive for receiving and responding to electronic requests. The networking interfaces 110*b*, 111*b*, 120*b*, 130*b*, 150*b* may implement the client-server platform technology that may interact, via the computer bus, with the one or more memories 110*c*, 111*c*, 120*c*, 130*c*, 150*c* (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 110*b*, 111*b*, 120*b*, 130*b*, 150*b* may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 160. In some embodiments, the network 160 may comprise a private network or local area network (LAN). Additionally, or alternatively, the network 160 may comprise a public network such as the Internet. In some embodiments, the network 160 may comprise routers, wireless switches, or other such wireless connection points communicating to the network interfaces 110*b*, 111*b*, 120*b*, 130*b*, 150*b* via wireless communications based on any one or more of various wireless standards, including by non-limiting example, IEEE 802.11a/b/c/g (WIFI), the BLUETOOTH standard, or the like.

The I/O module 111*e* may include or implement operator interfaces configured to present information to an administrator or operator and/or receive inputs from the administrator or operator. An operator interface may provide a display screen (e.g., via the workstation 111) which a user/operator may use to visualize any images, graphics, text, data, features, pixels, and/or other suitable visualizations or information. For example, the workstation 111, the central server 110, the imaging device 120, and/or the POS station 130 may comprise, implement, have access to, render, or otherwise expose, at least in part, a graphical user interface (GUI) for displaying images, graphics, text, data, features, pixels, and/or other suitable visualizations or information on the display screen. The I/O module 111*e* may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the workstation 111. According to some embodiments, and as previously mentioned, an administrator or user/operator may access the workstation 111 to initiate imaging setting calibration, review images or other information, make changes, input responses and/or selections, and/or perform other functions.

As described above herein, in some embodiments, the central server 110 may perform the functionalities as discussed herein as part of a "cloud" network or may otherwise communicate with other hardware or software components within the cloud to send, retrieve, or otherwise analyze data or information described herein. Moreover, it will be understood that the above disclosure is one example and does not necessarily describe every possible embodiment. As such, it will be further understood that alternate embodiments may include fewer, alternate, and/or additional steps or elements.

Figure 2:
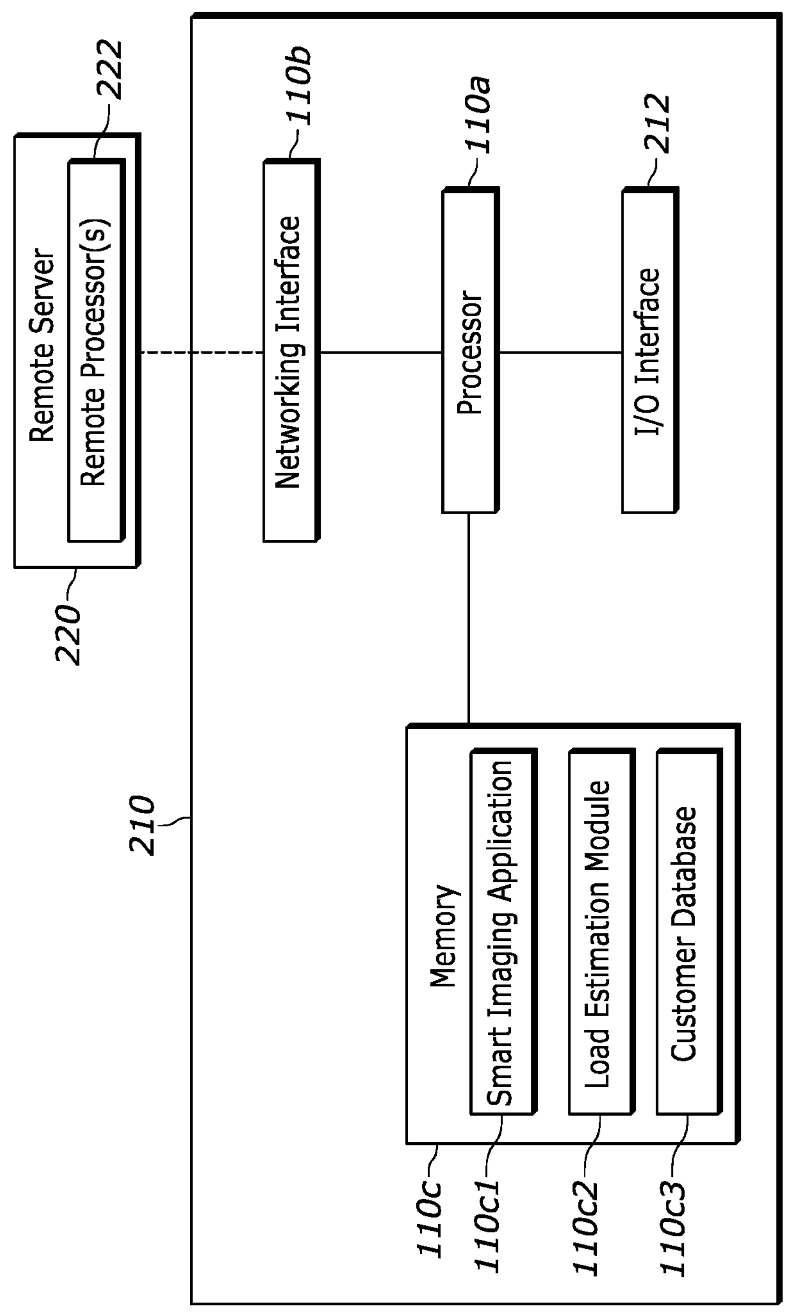
FIG. 2 is a block diagram of an example logic circuit for implementing example methods and/or operations described herein.

FIG. 2 is a block diagram representative of an example logic circuit capable of implementing, for example, one or more components of the central server 110 of FIG. 1. The example logic circuit of FIG. 2 is a processing platform 210 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 210 of FIG. 2 includes a processor 110*a* such as, for example, one or more microprocessors, controllers, and/or any suitable type of processor. The example processing platform 210 of FIG. 2 includes memory (e.g., volatile memory, non-volatile memory) 110*c* accessible by the processor 110*a* (e.g., via a memory controller). The example processor 110*a* interacts with the memory 110*c* to obtain, for example, machine-readable instructions stored in the memory 110*c* corresponding to, for example, the operations represented by the flowcharts of this disclosure. The memory 110*c* also includes the smart imaging application 110*c*1, the load estimation module 110*c*2, and the customer database 110*c*3, that are each accessible by the example processor 110*a*.

The smart imaging application 110*c*1, the load estimation module 110*c*2, and/or the customer database 110*c*3 may comprise or represent rule-based instructions, an artificial intelligence (AI) and/or machine learning-based model(s), and/or any other suitable algorithm architecture or combination thereof configured to, for example, predicting a required number of opened POS stations necessary to accommodate customers on a real-time basis. To illustrate, the example processor 110*a* may access the memory 110*c* to execute the smart imaging application 110*c*1 and/or the load estimation module 110*c*2 when the imaging device 120 (via the imaging assembly 120*d*) captures a set of image data comprising pixel data from a plurality of pixels. Additionally, or alternatively, machine-readable instructions corresponding to the example operations described herein may be stored on one or more removable media (e.g., a compact disc, a digital versatile disc, removable flash memory, etc.) that may be coupled to the processing platform 210 to provide access to the machine-readable instructions stored thereon.

The example processing platform 210 of FIG. 2 also includes a network interface 110*b* to enable communication with other machines via, for example, one or more networks. The example network interface 110*b* includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example, processing platform 210 of FIG. 2 also includes input/output (I/O) interfaces 212 to enable receipt of user input and communication of output data to the user. Such user input and communication may include, for example, any number of keyboards, mice, USB drives, optical drives, screens, touchscreens, etc.

Further, the example processing platform 210 may be connected to a remote server 220. The remote server 220 may include one or more remote processors 222, and may be configured to execute instructions to, for example, implement operations of the example methods described herein, as may be represented by the flowcharts of the drawings that accompany this description.

Figure 3:
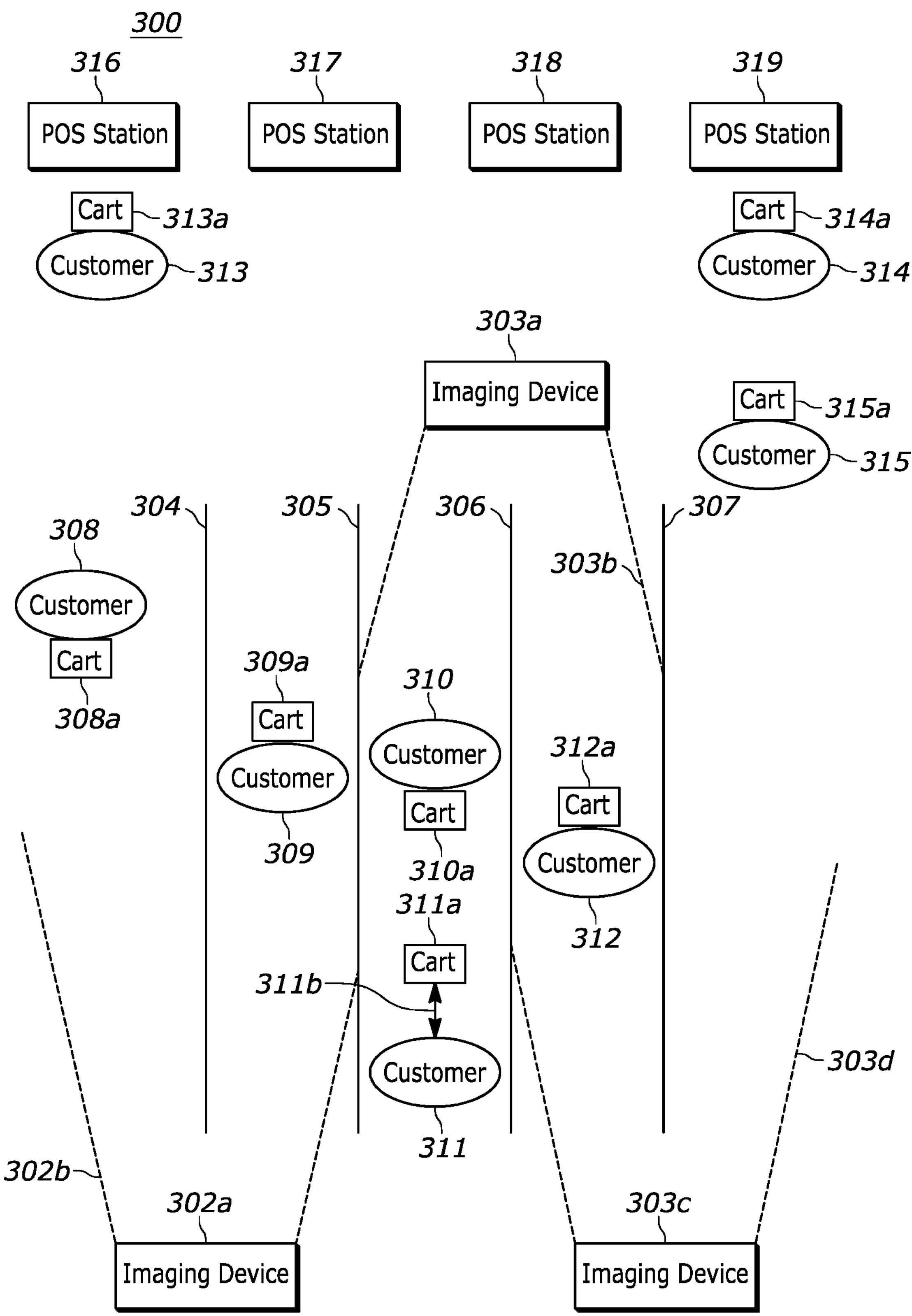
FIG. 3 depicts an example store location in which the example computing system of FIG. 1 may be implemented to predict a number of opened POS stations to accommodate a number of customers, in accordance with embodiments described herein.

FIG. 3 depicts an example store location 300 in which the example computing system (e.g., example computing system 100) of FIG. 1 may be implemented to predict a number of opened POS stations to accommodate a number of customers, in accordance with embodiments described herein. Generally, the example store location 300 may include imaging devices 302*a*, 303*a*, 303*c* that constantly and/or frequently capture and/or otherwise record image data corresponding to aisles 304, 305, 306, 307 within the example store location 300. Customers 308, 309, 310, 311, 312 may be traversing the aisles 304-307, and as a result, may be in the fields of view (FOV) 302*b*, 303*b*, 303*d* of the imaging devices 302*a*, 303*a*, 303*c*. Each of the customers 308-312 may also be pushing, carrying, and/or otherwise interacting with a cart 308*a*, 309*a*, 310*a*, 311*a*, 312*a* that may carry/hold products the customers 308-312 intend to purchase while the customers 308-312 traverse the aisles 304-307. For example, the carts 308*a*-315*a* illustrated in FIG. 3 may be or include carts, baskets, trolleys, and/or any other suitable device configured to transport purchasable items through a store. Several other customers 313, 314, 315 may also be present in the example store location 300, and these customers 313-315 may be waiting in a queue or actively participating in the checkout process with their respective carts 313*a*, 314*a*, 315*a* at a specific POS station 316, 317, 318, 319.

As illustrated in FIG. 3, the imaging devices 302*a*, 303*a*, 303*c* may capture and/or otherwise record image data corresponding to the customers 308-312, customers 313-315, and/or their respective carts 308*a*-315*a* while the customers 308-315 and carts 308*a*-315*a* are within any of the FOV 302*b*, 303*b*, 303*d*. More specifically, the imaging device 302*a* may capture and/or record image data corresponding to customers 308, 309, and 313 and their respective carts 308*a*, 309*a*, 313*a* that are within the FOV 302*b*. The imaging device 303*a* may capture and/or record image data corresponding to customers 310, 311, and 312 and their respective carts 310*a*, 311*a*, 312*a* that are within the FOV 303*b*. The imaging device 303*c* may capture and/or record image data corresponding to customers 312, 314, and 315 and their respective carts 312*a*, 314*a*, 315*a* that are within the FOV 303*d*.

When the imaging devices 302*a*, 303*a*, 303*c* capture and/or record the image data, the imaging devices 302*a*, 303*a*, 303*c* may transmit the image data to a central server (e.g., central server 110) for processing/analysis and/or may process/analyze the image data locally. In either case, the device processing the image data (referenced herein as the "processing device") may analyze the image data to determine (i) a set of customer data and (ii) a cart occupancy value associated with each of the customers 308-315. In certain embodiments, the set of customer data may include: (i) a customer number, (ii) customer age values, or (iii) a customer ability value. It should be understood that the set of customer data may include any suitable data corresponding to customers, such as demographic information. For example, in the example of FIG. 3, the processing device may determine that eight customers 308-315 are present in the store (e.g., a customer number), the ages of these customers 308-315 range from twenty-five to sixty-four (e.g., customer age values), and that one customer is traversing the example store location 300 using a motorized scooter (e.g., a customer ability value).

As part of this image data analysis, the processing device may also generate a visual embedding and customer identification (ID) value corresponding to each customer 308-315 that appears in the image data. In this manner, the processing device may preserve major structural features of the customer's 308-315 face and/or other features (e.g., clothing) for future recognition without occupying valuable storage resources with the original image data set corresponding to the customer's 308-315 face and/or other features. In any event, the processing device may execute a machine vision algorithm (e.g., smart imaging application 110*c*1, 120*c*1) that may be configured to generate the visual embedding and the customer ID value corresponding to each customer 308-315. More specifically, the processing device may execute an algorithm (e.g., facial recognition algorithm) that is configured to identify the approximate face region of customers 308-315 in the image data. The processing device may then generate the visual embedding and customer ID value through a trained ML algorithm that receives the image data of the customer's 308-315 face and/or other features and outputs the visual embedding and the customer ID value. The processing device may then store the visual embedding and the customer ID value for each customer 308-315 in a database (e.g., customer database 110*c*3).

Generating the visual embedding may also enable the processing device to quickly and easily re-identify customers 308-315 as they traverse through the example store location 300 without occupying valuable processing resources to independently verify their identities every time the customers 308-315 are represented in image data. For example, the processing device may generate the visual embedding and the customer identification value for a respective customer at a first time, and the processing device may update the cart occupancy value for the respective customer at a second time that is different from the first time. In this manner, the processing device quickly identifies/verifies the customer based on their corresponding visual embedding and customer ID value stored in memory (e.g., customer database 110*c*3), and can dedicate processing resources to determining an updated cart occupancy value for the customer's cart instead. This repetitive sequence of identifying the customer based on their visual embedding and/or customer ID value and proceeding to evaluate the cart occupancy value may save significant processing resources over time, as the processing device may avoid repeatedly comparing the raw image data of a customer's face to stored raw image data.

To further increase processing/storage resource efficiencies, the processing device may also delete the visual embedding and the customer ID value for a respective customer at a third time. In particular, the processing device may delete the visual embedding and the customer ID value for the respective customer when the respective customer does not appear in subsequent image data at the third time, and the third time exceeds a threshold value relative to the second time. For example, the processing device may determine that a respective customer (e.g., customer 313) does not appear in subsequent image data at a third time after the respective customer has checked out of the example store location 300.

Continuing the above example, the processing device may compare the third time to the last time the respective customer appeared in image data of the example store location 300 and generate a difference value (e.g., ten minutes) between the third time and the last time. The processing device may then compare the difference value to a threshold value (e.g., five minutes), and may determine that the respective customer has not appeared in any image data of the example store location 300 for longer than the threshold time. Accordingly, the processing device may presume that the respective customer has exited the example store location 300 and will likely not appear in image data of the example store location 300 again that day (or week), so the processing device may delete the visual embedding and the customer ID value of the respective customer from memory (e.g., customer database 110*c*3). In this manner, the processing device may eliminate visual embeddings and customer ID values from the customer database that simply occupy valuable storage resources because the customer is no longer present in the example store location 300, and the processing device may not access/reference these visual embeddings or customer ID values any more that day, week, month, etc. Accordingly, the processing device actively makes storage resources available for more relevant data, such as new visual embeddings, customer ID values, customer data, and/or other data that the processing device may actively use during the remainder of the day, week, month, etc.

Further, the processing device may determine the cart occupancy value corresponding to each customer 308-315 by analyzing the approximate fullness or occupancy of the cart 308*a*-315*a* associated with each customer 308-315, as represented in the image data. Moreover, the processing device may determine an association between the customers 308-315 and their respective carts 308*a*-315*a* based on the visual embedding of the customer 308-315 and a physical proximity value of the respective customer 308-315 and the corresponding cart 308*a*-315*a*. For example, the processing device may analyze the image data of the imaging device 303*a* corresponding to customer 310, and may determine an association between the cart 310*a* and the customer 310 because the customer 310 is physically proximate to the cart 310*a*. The processing device may then store this association between the customer 310 and the cart 310*a* in memory (e.g., in the customer database 110*c*3) along with the visual embedding and customer ID value corresponding to the customer 310.

As another example, the processing device may not automatically generate an association between the customer 311 and the cart 311*a* because there is a significant amount of physical separation 311*b* between the customer 311 and the cart 311*a*. If the customer 311 reduces and/or eliminates the physical separation 311*b* between the customer 311 and the cart 311*a*, the processing device may proceed to determine an association between the customer 311 and the cart 311*a*. However, if the customer 311 is only transiently proximate to the cart 311*a*, the processing device may not determine such an association. Alternatively, the customer 311 may transiently leave and/or otherwise move away from the cart 311*a* (e.g., walking down an aisle 305, 306 to retrieve a product), and the processing device may still determine and/or retain an association between the customer 311 and the cart 311*a*, particularly if the customer 311 returns to the cart 311*a*. Regardless, if the customer 311 leaves the cart 311*a*, and no other customer 308-310, 312-315 approaches and/or otherwise consistently interacts with the cart 311*a*, then the processing device may determine that the cart 311*a* is abandoned in the example store location 300, and may issue an alert signal to employees or store management indicating the abandoned cart 311*a*.

In any event, with the set of customer data, and the cart occupancy values, the processing device may then generate a first value by utilizing a ML algorithm (e.g., part of the load estimation module 110*c*2, 120*c*2). The ML algorithm may be trained using a plurality of training data that includes a plurality of training customer data and a plurality of training cart occupancy values. As previously mentioned, the first value may be or include an estimated/predicted POS station capacity value, an estimated/predicted customer checkout time, and/or any other suitable values or combinations thereof. In certain embodiments, a ML algorithm may be trained and/or otherwise configured to determine the association between a customer and a cart.

For example, the processing device may input the set of customer data and the cart occupancy values determined based on the image data captured by imaging devices 302*a*, 303*a*, 303*c* into the ML algorithm (e.g., load estimation module 110*c*2). The processing device may determine that two POS stations 316, 319 are currently open and in-use (e.g., by customers 313-315) based on data received from the two POS stations 316, 319 and/or from image data captured by imaging devices, and the ML algorithm may determine that three POS stations should be open in five to ten minutes to accommodate additional customers (e.g., customers 308-312) that may be ready to checkout at that time. In certain embodiments, the processing device may communicate with the POS stations 316-319 to retrieve timing details regarding customers 313-315 checking out, such as which POS stations 316-319 are currently in-use. Additionally, or alternatively, the ML algorithm may determine a customer checkout value for each customer, and the processing device may then sum over the customer checkout values for each customer in line at each individual open POS station, and display a total estimated checkout value at each POS station.

Continuing the above example, the ML algorithm may determine that three customers 308, 309, 312 have a cart occupancy value greater than fifty percent, and that these three customers 308, 309, 312 are relatively young (e.g., twenty-five, thirty-two, and thirty-five, respectively), such that these customers 308, 309, 312 are likely to finish shopping soon and approach the POS stations 316-319 ready to checkout. The ML algorithm may also determine that the two POS stations 316, 319 currently open and in-use may not provide sufficient POS station capacity to accommodate these additional customers 308, 309, 312, and may not yield acceptable checkout times/queue lengths for these customers 308, 309, 312. Accordingly, the ML algorithm may conclude that an additional POS station should be opened to accommodate the likely additional customer flow towards the POS stations 316-319 to checkout in the near future because the estimated POS station capacity value (three) exceeds the current POS station capacity value (two).

As another example, the processing device may input the set of customer data and the cart occupancy values determined based on the image data captured by imaging devices 302*a*, 303*a*, 303*c* into the ML algorithm (e.g., load estimation module 110*c*2). The ML algorithm may determine that the customers 313-315 currently checking-out have an approximate wait time of three to five minutes, and that the approximate wait time in five to ten minutes may be ten to fifteen minutes as a result of additional customers (e.g., customers 308-312) that may be ready to checkout at that time. Similar to the prior example, the ML algorithm may determine that three customers 308, 309, 312 have a cart occupancy value greater than fifty percent, and that these three customers 308, 309, 312 are relatively young (e.g., twenty-five, thirty-two, and thirty-five, respectively), such that these customers 308, 309, 312 are likely to finish shopping soon and approach the POS stations 316-319 ready to checkout.

Further in this example, the ML algorithm may also evaluate the customers 313-315 currently checking-out, and may determine that these customers 313-315 have relatively low cart occupancy, and are waiting in either a very short queue (e.g., one customer 314 ahead of customer 315) or no queue at all (e.g., customer 313). Thus, the corresponding wait times for these customers 313-315 to checkout are relatively short (three to five minutes). The ML algorithm may then determine that the relatively high cart occupancy and small number of available POS stations 316, 319 may cause the three customers 308, 309, 312 and/or other customers 310, 311 that may checkout later to have unacceptable checkout times/queue lengths (e.g., ten to fifteen minutes, several customers long). Accordingly, the ML algorithm may conclude that an additional POS station should be opened to accommodate the likely additional customer flow towards the POS stations 316-319 to checkout in the near future because the estimated customer checkout time (ten to fifteen minutes) exceeds a threshold value (e.g., five minutes).

As mentioned in the above examples, the processing device may also determine whether the first value exceeds a second value, such that the processing device may subsequently determine how to remedy any potential POS capacity issues. The second value may generally be or include a threshold value corresponding to the outputs of the ML algorithm. For example, the second value may be or include a POS station capacity value threshold, a customer checkout time threshold, and/or any other suitable threshold or combinations thereof. Regardless, responsive to determining that the first value exceeds the second value, the processing device may generate an alert for transmission to a device indicating that the first value exceeds the second value. The device may be or include a workstation (e.g., workstation

111), a POS station 316-319, and/or any other user device that a store employee may have that is connected to a network (e.g., network 160).

Of course, in certain instances, the first value may not exceed the second value. In these instances, the processing device may still issue an alert to a device. More specifically, responsive to determining that the first value does not exceed the second value, the processing device may generate an alert for transmission to the device indicating that the first value does not exceed the second value. For example, the alert may state that, based upon recent image data, POS station 316-319 capacity is sufficient, and that customer 308-315 queue lengths and wait times are similarly sufficient (e.g., do not violate a queue length or wait time threshold). In response to receiving this alert, the administrator and/or other employee may not change the number of open POS stations 316-319. Additionally, or alternatively, the alert may indicate that the current POS station capacity exceeds the requirements of the current and/or estimated customer 30-315 flow to the POS stations 316-319, such that a number of currently open and unused POS stations should be closed and the employees managing those POS stations reassigned to perform more urgent tasks.

Figure 4:
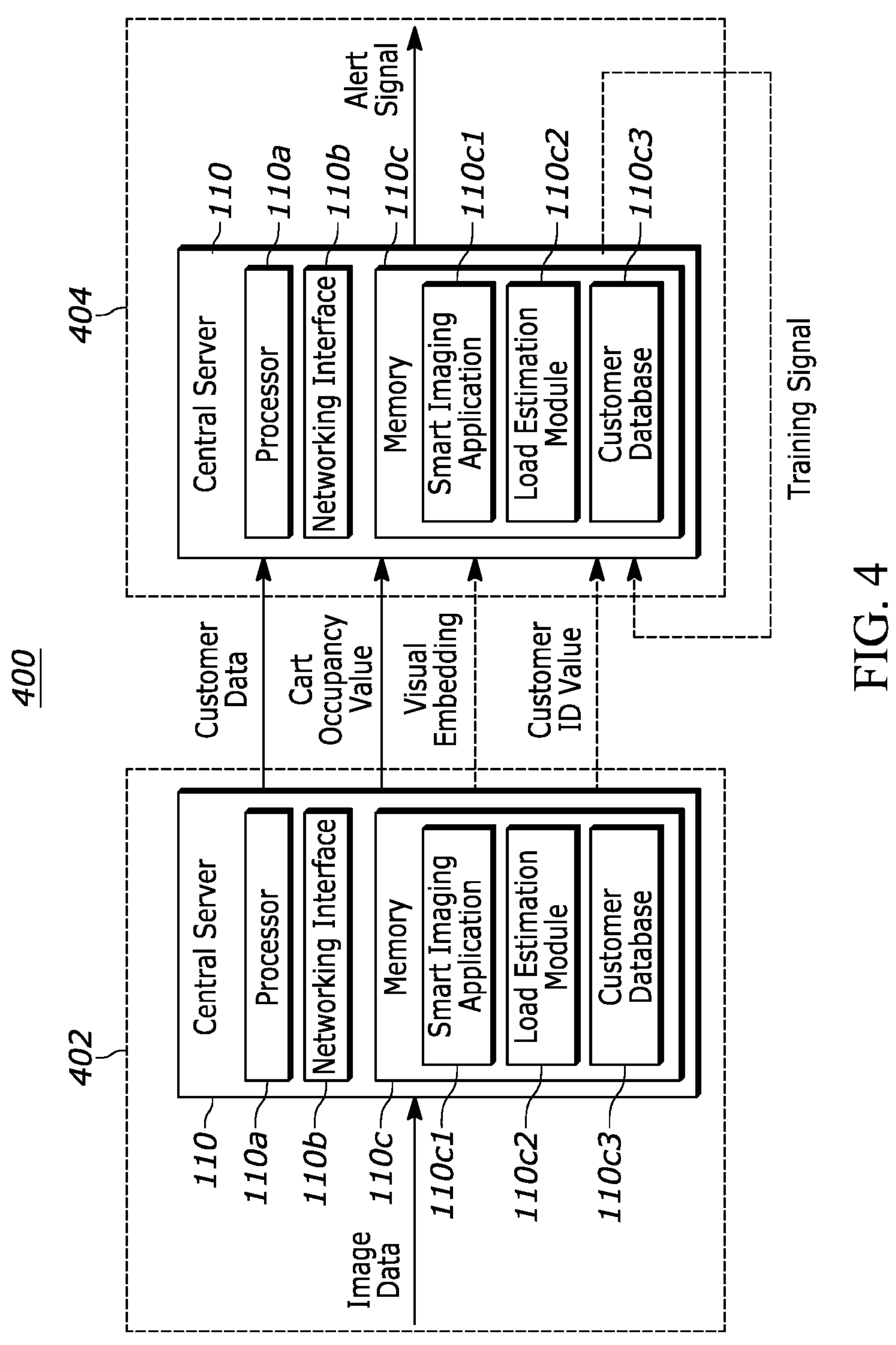
FIG. 4 is an example workflow block diagram for predicting a required number of opened POS stations to accommodate a number of customers, in accordance with embodiments described herein.

FIG. 4 is an example workflow 400 block diagram for predicting a required number of opened POS stations to accommodate a number of customers, in accordance with embodiments described herein. The example workflow 400 generally illustrates various data received/retrieved by the central server 110 that is utilized by the computer-executable instructions (e.g., smart imaging application **110*c*1, load estimation module 110*c*2) stored in memory 110*c* as inputs to generate various outputs. At a first time 402, the various data received/retrieved by the central server 110 includes image data, and the central server 110 may output customer data, cart occupancy values, visual embeddings, and/or customer ID values. At a second time 404, the central server 110** may receive/retrieve the customer data, the cart occupancy values, the visual embeddings, the customer ID values, and/or training signals to output an alert signal and/or the training signal.

Thus, the inputs/outputs of the central server 110 at the first time 402 may generally represent the central server 110 extracting and/or otherwise determining data from the image data, and the inputs/outputs of the central server 110 at the second time 404 may generally represent the central server 110 interpreting the outputs from the first time 402 to generate an alert signal and/or training signal. Of course, it should be understood that the input/outputs illustrated in FIG. 4 are for the purposes of discussion only, and may not represent and/or include every input/output.

For example, in certain instances, the central server 110 may receive and/or generate a POS capacity value, a customer checkout value, and/or a queue length value. The POS capacity value may be or include the current capacity of open POS stations to accommodate additional customers without violating a wait time threshold for each customer (e.g., POS station 4 can accommodate one additional customer), a number of POS stations that are currently open to service customer checkout (e.g., there are 3 POS stations currently open), and/or any other suitable value. The customer checkout value may be or include a current checkout time in a queue for an individual POS station. For example, the customer checkout value may indicate that a new customer in line for POS station 1 may wait fifteen minutes to checkout, and a new customer in line for POS station 3 may wait ten minutes to checkout. The queue length value may be or include a current number of customers in each individual POS station line (e.g., three customers in line for POS station 1, two customers in line for POS station 3), an approximate/average wait time for customers in a particular POS station queue to checkout (e.g., five minute wait at POS station 3, eight minute wait at POS station 1) (also referenced herein as a "customer checkout value"), and/or any other suitable value. The central server 110 may utilize these values and/or other similar values as part of the evaluations performed at the first time 402, the second time 404, training/re-training models via the training signal, and/or at any other suitable time or combinations thereof.

As previously described, the image data, the customer data, and/or the cart occupancy values received/retrieved by the central server 110 may include a large variety of specific information/data. For example, the customer data may include data indicative of a current number of customers in a store location, an age of each customer in the store location, a gender of each customer in the store location, any disabilities associated with customers in the store location, and/or any other suitable information corresponding to customers in the store location. In certain embodiments, the visual embeddings and customer ID values corresponding to each customer may also be included as part of the customer data. The cart occupancy values may represent the current cart occupancy of each customer in the store location, and may be stored in a customer database (e.g., customer database **110*c*3**) with the customer data.

Using this data as input, the models that are included as part of the smart imaging application **110*c*1 and/or the load estimation module 110*c*2 and/or other instructions stored in memory 110*c* may determine one or more of the outputs. For example, at the first time 402, the processors 110*a* may utilize the image data to determine the customer data, the cart occupancy value, and/or visual embeddings and customer ID values. At the second time 404, the processors 110*a*** may utilize the customer data, the cart occupancy value, and/or visual embeddings and customer ID values to determine the alert signal and/or the training signal.

As previously mentioned, the alert signal may generally include an alert message for a store employee or manager corresponding to the number of POS stations that should be opened for customer checkout. For example, the alert message may indicate that additional POS stations should be activated or made available for use, that customer queue lengths and/or wait times are too long or sufficient, that one or more POS stations should be closed or deactivated and the employees managing those POS stations reassigned to perform more urgent tasks, an abandoned cart is located in a particular aisle and should be removed, and/or any other suitable alert or combinations thereof. In certain embodiments, the alert signal may also include a confidence interval or value representing the confidence of the estimation/prediction made by the ML algorithm(s).

For example, the confidence interval may be represented in the alert signal by a single numerical value (e.g., 1, 2, 3, etc.), an interval (e.g., 90% confident that between one and two POS stations should be opened within the next five minutes), a percentage (e.g., 95%, 50%, etc.), an alphanumerical character(s) (e.g., A, B, C, etc.), a symbol, and/or any other suitable value or indication of a likelihood that the estimated POS station capacity value determined by the ML model (e.g., ML model of the load estimation module **110*c*2**) is representative of a beneficial adjustment to the current POS station capacity.

In certain embodiments, the central server 110 may also determine a training signal to train and/or re-train models that are included as part of the smart imaging application 110*c*1 and/or the load estimation module 110*c*2 and/or other instructions stored in memory 110*c*. Generally, the training signal may include and/or otherwise represent an indication that an estimation/prediction generated by the models that are included as part of the smart imaging application 110*c*1 and/or the load estimation module 110*c*2 was correct, incorrect, accurate, inaccurate, and/or otherwise reflect the ability of the models to generate accurate outputs in response to receiving certain inputs.

In particular, and in some embodiments, the central server 110 may utilize a training signal to train the ML model (e.g., as part of the load estimation module 110*c*2), and the training signal may include a plurality of training data. The plurality of training data may include (i) a plurality of training customer data, (ii) a plurality of training cart occupancy values, (iii) a plurality of training POS capacity values, (iv) a plurality of training customer checkout values, and/or any other suitable training data. As a result of this training and/or re-training performed using the training signal, the trained ML model may then generate a first value based on (i) the set of customer data, (ii) the cart occupancy values, (iii) a POS capacity value, (iv) a customer checkout value, and/or any other suitable values or combinations thereof. Accordingly, the central server 110 may utilize the training signal in a feedback loop that enables the central server 110 to re-train, for example, the models that are included as part of the smart imaging application 110*c*1 and/or the load estimation module 110*c*2 based, in part, on the outputs of those models during run-time operations and/or during a dedicated offline training session.

Figure 5:
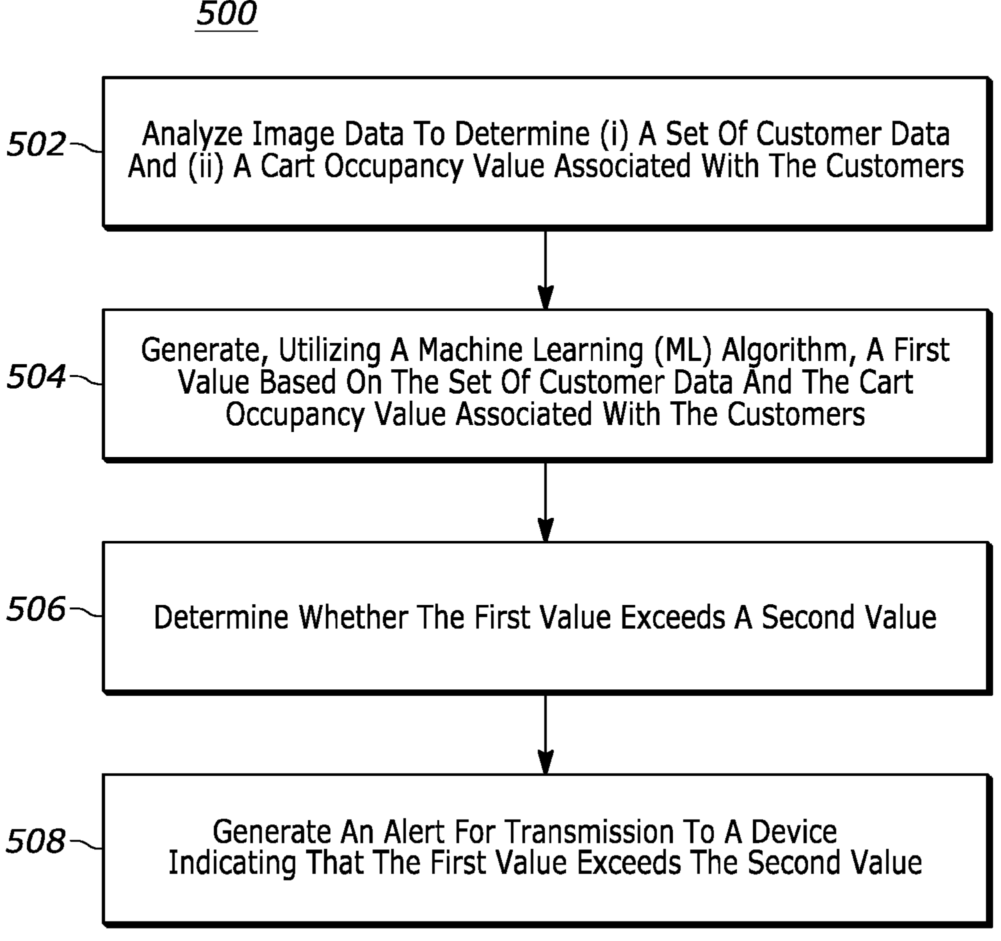
FIG. 5 is a flowchart representative of a method for predicting a required number of opened POS stations to accommodate a number of customers, in accordance with embodiments described herein.

FIG. 5 is a flowchart representative of a method 500 for predicting a required number of opened POS stations to accommodate a number of customers, in accordance with embodiments described herein. Generally, and as mentioned above, the method 500 for predicting a required number of opened POS stations to accommodate a number of customers utilizes captured image data to determine a set of customer data and cart occupancy values, generate a first value based on the set of customer data and cart occupancy values by utilizing a ML model, determine whether the first value exceeds a second value, and generate an alert indicating that the first value exceeds the second value. More specifically, the method 500 enables the central server (e.g., central server 110), the imaging device (e.g., imaging device 120), and/or another suitable device (e.g., workstation 111) to improve POS station capacity estimation by accurately and efficiently determining whether or not the current number of opened POS stations is sufficient to accommodate the number of customers. It is to be understood that any of the steps of the method 500 may be performed by, for example, the central server 110, the workstation 111, the imaging device 120, the POS station 130, the external server 150, and/or any other suitable components or combinations thereof discussed herein.

At block 502, the method 500 includes analyzing image data to determine (i) a set of customer data and (ii) a cart occupancy value associated with the customers. In certain embodiments, the set of customer data may include: (i) a customer number, (ii) customer age values, (iii) a customer ability value, and/or any other suitable demographic information corresponding to a customer (e.g., gender, etc.). Further, in certain embodiments, the method 500 may include executing a machine vision algorithm (e.g., as part of the smart imaging application 110*c*1, 120*c*1) configured to generate a visual embedding and a customer ID value corresponding to each customer. In these embodiments, the method 500 may further include storing the visual embedding and the customer ID value for each customer in a database (e.g., customer database 110*c*3).

In some embodiments, the method 500 may further include generating the visual embedding and the customer ID value for a respective customer at a first time. In particular, the central server 110 and/or the imaging device 120 may generate a visual embedding and customer ID value when the customer is identified as entering the store location by an imaging device 120 disposed near an entrance of the store location and/or at any initial detection of the customer by any imaging devices 120 disposed along an aisle or other location within the store location.

Further in these embodiments, the method 500 may include updating the cart occupancy value for the respective customer at a second time that is different from the first time. The method 500 may then include deleting the visual embedding and the customer ID value for a respective customer at a third time. At the third time, the respective customer may not appear in subsequent image data, and the third time may also exceed a threshold value relative to the second time. Additionally, or alternatively, the visual embedding and customer ID value for a respective customer may be deleted if an imaging device 120 captures image data indicating that the respective customer is currently checking out of the store location and/or indicates that the respective customer exited the store location.

Of course, it should be appreciated that the visual embeddings and/or customer ID values may also include embeddings and/or ID values for store employees that are expected to be present in a store location for extended periods of time. Accordingly, the embeddings and/or ID values corresponding to such store employees may not be added/deleted in a similar manner as the embeddings and/or ID values of customers who are anticipated to be transiently present in a store location.

In certain embodiments, the visual embedding and the customer ID value may be generated for a respective customer at a first time, and the method 500 may further comprise: detecting the respective customer within subsequent image data at a second time that is different from the first time. Further in these embodiments, the method 500 may include verifying that the visual embedding and the customer ID value for the respective customer are stored in the database, and updating the cart occupancy value for the respective customer.

In some embodiments, the method 500 may further include determining an association between a respective customer and a corresponding cart based on (i) the visual embedding and (ii) a physical proximity value of the respective customer and the corresponding cart.

The method 500 may further include generating, utilizing a machine learning (ML) algorithm, a first value based on the set of customer data and the cart occupancy value associated with the customers (block 504). The ML algorithm may be trained using a plurality of training data including a plurality of training customer data and a plurality of training cart occupancy values. More specifically, in certain embodiments, the ML algorithm may be or include a neural network (NN), such as a convolutional neural network (CNN). However, in some embodiments, the algorithm may be or include a regression model, a fuzzy logic model, and/or any other suitable model or combinations thereof.

In some embodiments, the method 500 may further include training the ML model using the plurality of training data including (i) the plurality of training customer data, (ii) the plurality of training cart occupancy values, and/or (iii) a plurality of training POS capacity values. Further in these embodiments, the method 500 may also include generating, utilizing the ML model, the first value based on (i) the set of customer data, (ii) the cart occupancy value associated with the customers, and/or (iii) a POS capacity value.

In certain embodiments, the method 500 may also include training the ML model using the plurality of training data including (i) the plurality of training customer data, (ii) the plurality of training cart occupancy values, and (iii) a plurality of training customer checkout values. Further in these embodiments, the method 500 may include generating, utilizing the ML model, the first value based on (i) the set of customer data, (ii) the cart occupancy value associated with the customers, and (iii) a customer checkout value.

Further, in certain embodiments, the method 500 may include summing over all customer checkout values at each POS station to determine a total estimated checkout value for each POS station. The method 500 may further include analyzing this total estimated checkout value, a current number of opened POS stations, and/or a pre-defined acceptable checkout time threshold for customers in line to check-out at a POS station to determine whether to increase the number of opened POS stations, decrease the number of opened POS stations, or leave the number of opened POS stations at the current number. In any event, the method 500 may further include generating/transmitting an alert signal to an appropriate individual (e. g., store manager) that includes an indication of whether to increase the number of opened POS stations, decrease the number of opened POS stations, or leave the number of opened POS stations at the current number.

The method 500 may further include determining whether the first value exceeds a second value (block 506), and responsive to determining that the first value exceeds the second value, generating an alert for transmission to a device indicating that the first value exceeds the second value (block 508). In certain embodiments, the method 500 may further include, responsive to determining that the first value does not exceed the second value, generating an alert for transmission to the device indicating that the first value does not exceed the second value.

Of course, it is to be appreciated that the actions of the method 500 may be performed any suitable number of times in order to generate an alert, and that the actions described in reference to the method 500 may be performed any suitable number of times and in any suitable order.

Figure 6:
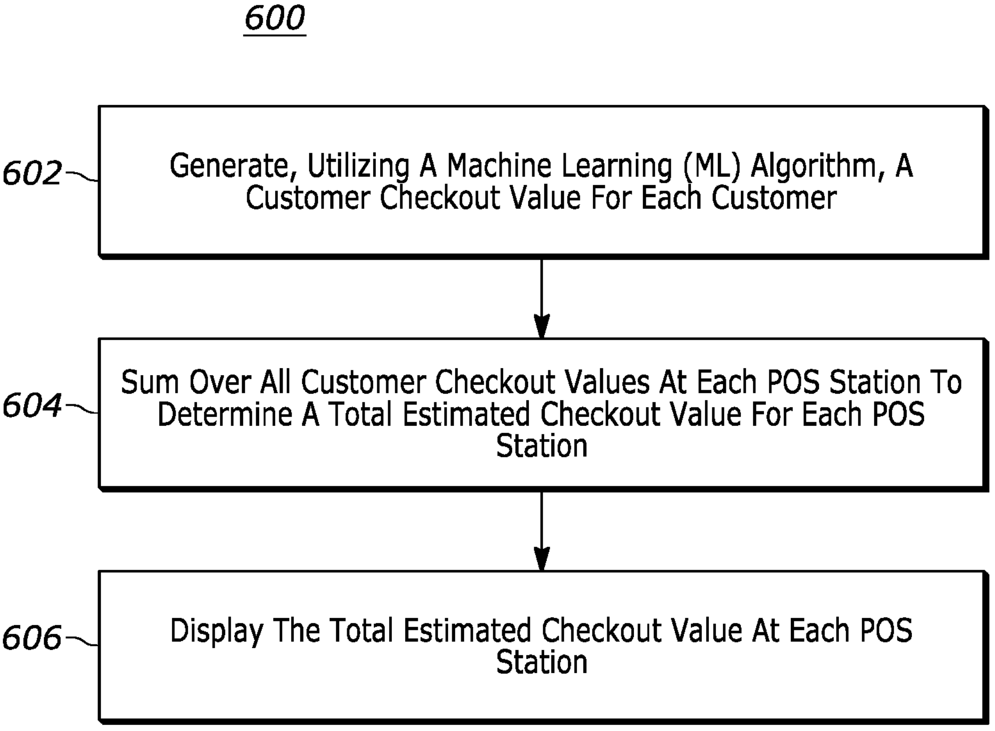
FIG. 6 is a flowchart representative of a method for displaying a total estimated checkout value at POS stations, in accordance with embodiments described herein.

FIG. 6 is a flowchart representative of a method 600 for displaying a total estimated checkout value at POS stations, in accordance with embodiments described herein. Generally, the method 600 for displaying a total estimated checkout value at POS stations utilizes a set of customer data and cart occupancy values to generate a customer checkout value for each customer by utilizing a ML model, sum over the customer checkout values, and display a total estimated checkout value at each POS station. More specifically, the method 600 enables the central server (e.g., central server 110), the imaging device (e.g., imaging device 120), and/or another suitable device (e.g., workstation 111) to improve POS station capacity estimation by accurately and efficiently determining a wait time for customers at specific POS stations. It is to be understood that any of the steps of the method 600 may be performed by, for example, the central server 110, the workstation 111, the imaging device 120, the POS station 130, the external server 150, and/or any other suitable components or combinations thereof discussed herein.

At block 602, the method 600 includes generating, utilizing a ML algorithm, a customer checkout value for each customer. The method 600 may further include summing over all customer checkout values at each POS station to determine a total estimated checkout value for each POS station (block 604). The method 600 may further include displaying the total estimated checkout value at each POS station (block 606).

As an example, the ML algorithm may receive a set of customer data and customer ID values for each customer currently in line at a POS station. There may be three customers in line at a first POS station, and two customers in line at a second POS station. The ML algorithm may then estimate a customer checkout value for each customer. The customer checkout value for the first customer in line at the first POS station may be two minutes based on their set of customer data, customer ID value, and cart occupancy value. The customer checkout value for the second customer in line at the first POS station may be five minutes based on their set of customer data, customer ID value, and cart occupancy value. The customer checkout value for the third customer in line at the first POS station may be twelve minutes based on their set of customer data, customer ID value, and cart occupancy value. Similarly, the customer checkout value for the first customer in line at the second POS station may be seven minutes based on their set of customer data, customer ID value, and cart occupancy value. The customer checkout value for the second customer in line at the second POS station may be ten minutes based on their set of customer data, customer ID value, and cart occupancy value.

Continuing the above example, the processors of any suitable processing device may then add these customer checkout values together to display the total estimated checkout value at each POS station. The total estimated checkout value at the first POS station may be the sum of the customer checkout value for the first (two minutes), second (five minutes), and third (twelve minutes) customers waiting in the queue at the first POS station. Accordingly, the total estimated checkout value at the first POS station may be nineteen minutes. The total estimated checkout value at the second POS station may be the sum of the customer check-out value for the first (seven minutes) and second (ten minutes) customers waiting in the queue at the second POS station. Accordingly, the total estimated checkout value at the second POS station may be seventeen minutes. Thus, a display proximate to and/or otherwise associated with the first POS station may display the total estimated checkout value of nineteen minutes, and a display proximate to and/or otherwise associated with the second POS station may display the total estimated checkout value of seventeen minutes for viewing by the customers currently in line and/or customers that are approaching the POS stations for checkout.

Of course, it is to be appreciated that the actions of the method 600 may be performed any suitable number of times to generate and display the total estimated checkout value, and that the actions described in reference to the method 600 may be performed any suitable number of times and in any suitable order. Moreover, it should be understood that the customer checkout values, the total estimated checkout value, and/or any other values or determinations made as part of the method 600 may be used and/or otherwise included in any of the embodiments described herein. For example, the customer checkout values and/or the total estimated checkout value may be used as input to a ML algorithm and/or may be otherwise used (e.g., during postprocessing of ML algorithm outputs) to determine in the method 500 as part of the determination of the first value.

ADDITIONAL CONSIDERATIONS

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method comprising:

training a machine learning (ML) model using a plurality of training data including (i) a plurality of training customer data, (ii) a plurality of training cart occupancy values, (iii) a plurality of training point of sale (POS) capacity values, and (iv) a plurality of training customer checkout values;

capturing, by an imaging device, image data of one or more customers and one or more carts;

analyzing, by one or more processors, the image data to determine (i) a set of customer data indicative of a number of respective customers and (ii) a cart occupancy value associated with the respective customers, and to generate a visual embedding and a customer identification value corresponding to each customer;

generating, utilizing the trained ML model, a first value based on the set of customer data and the cart occupancy value associated with the respective customers;

determining, by the one or more processors, whether the first value exceeds a second value; and responsive to determining that the first value exceeds the second value, generating, utilizing the trained ML model, an adjustment indicative of a number of POS stations to accommodate the number of respective customers and a confidence value associated with the adjustment, and generating, by the one or more processors, an alert for transmission to a device indicating the first value exceeds the second value, indicating the adjustment, and indicating the confidence value associated with the adjustment.

2. The method of claim 1, wherein analyzing the image data further comprises:

executing, by the one or more processors, a machine vision algorithm configured to generate the visual embedding and the customer identification value corresponding to each customer; and storing, by the one or more processors, the visual embedding and the customer identification value for each customer in a database.

3. The method of claim 2, further comprising:

generating, by the one or more processors, the visual embedding and the customer identification value for a respective customer at a first time;

updating, by the one or more processors, the cart occupancy value for the respective customer at a second time that is different from the first time; and deleting, by the one or more processors, the visual embedding and the customer identification value for a respective customer at a third time, wherein the respective customer does not appear in subsequent image data at the third time, and the third time exceeds a threshold value relative to the second time.

4. The method of claim 2, further comprising:

determining, by the one or more processors, an association between a respective customer and a corresponding cart based on (i) the visual embedding and (ii) a physical proximity value of the respective customer and the corresponding cart.

5. The method of claim 2, wherein the one or more processors generate the visual embedding and the customer identification value for a respective customer at a first time, and the method further comprises:

detecting, by the one or more processors, the respective customer within subsequent image data at a second time that is different from the first time;

verifying, by the one or more processors, that the visual embedding and the customer identification value for the respective customer are stored in the database; and updating, by the one or more processors, the cart occupancy value for the respective customer.

6. The method of claim 1, further comprising:

generating, utilizing the trained ML model, the first value based on (i) the set of customer data, (ii) the cart occupancy value associated with the respective customers, and (iii) a POS capacity value.

7. The method of claim 1, further comprising:

generating, utilizing the trained ML model, the first value based on (i) the set of customer data, (ii) the cart occupancy value associated with the respective customers, and (iii) a customer checkout value.

8. The method of claim 1, further comprising:

responsive to determining that the first value does not exceed the second value, generating, by the one or more processors, an alert for transmission to the device indicating that the first value does not exceed the second value.

9. The method of claim 1, wherein the ML model is a convolutional neural network (CNN), and the set of customer data further includes: customer age values, or a customer ability value.

10. A system comprising:

at least one processor; and a memory storing instructions that, when executed by the at least one processor, cause the at least one processor to:

capture image data of one or more customers and one or more carts, analyze the image data to determine (i) a set of customer data indicative of a number of respective customers and (ii) a cart occupancy value associated with the respective customers, and to generate a visual embedding and a customer identification value corresponding to each customer, train a machine learning (ML) model using a plurality of training data including a plurality of training customer data, a plurality of training cart occupancy values, a plurality of training point of sale (POS) capacity values, and a plurality of training customer checkout values, generate, utilizing the trained ML model, a first value based on the set of customer data and the cart occupancy value associated with the respective customers, determine whether the first value exceeds a second value, and responsive to determining that the first value exceeds the second value, generate, utilizing the trained ML model, an adjustment indicative of a number of POS stations to accommodate the number of respective customers and a confidence value associated with the adjustment, and generate an alert for transmission to a device indicating the first value exceeds the second value, indicating the adjustment, and indicating the confidence value associated with the adjustment.

11. The system of claim 10, wherein the instructions, when executed, further cause the at least one processor to analyze the image data by:

executing a machine vision algorithm configured to generate the visual embedding and the customer identification value corresponding to each customer, and storing the visual embedding and the customer identification value for each customer in a database.

12. The system of claim 11, wherein the instructions, when executed, further cause the at least one processor to:

generate the visual embedding and the customer identification value for a respective customer at a first time, update the cart occupancy value for the respective customer at a second time that is different from the first time, and delete the visual embedding and the customer identification value for a respective customer at a third time, wherein the respective customer does not appear in subsequent image data at the third time, and the third time exceeds a threshold value relative to the second time.

13. The system of claim 11, wherein the instructions, when executed, further cause the at least one processor to:

determine an association between a respective customer and a corresponding cart based on (i) the visual embedding and (ii) a physical proximity value of the respective customer and the corresponding cart.

14. The system of claim 11, wherein the instructions, when executed, further cause the at least one processor to:

generate the visual embedding and the customer identification value for a respective customer at a first time, detect the respective customer within subsequent image data at a second time that is different from the first time, verify that the visual embedding and the customer identification value for the respective customer are stored in the database, and update the cart occupancy value for the respective customer.

15. The system of claim 10, wherein the instructions, when executed, further cause the at least one processor to:

generate, utilizing the trained ML model, the first value based on (i) the set of customer data, (ii) the cart occupancy value associated with the respective customers, and (iii) a POS capacity value.

16. The system of claim 10, wherein the instructions, when executed, further cause the at least one processor to:

generate, utilizing the trained ML model, the first value based on (i) the set of customer data, (ii) the cart occupancy value associated with the respective customers, and (iii) a customer checkout value.

17. The system of claim 10, wherein the instructions, when executed, further cause the at least one processor to:

responsive to determining that the first value does not exceed the second value, generate an alert for transmission to the device indicating that the first value does not exceed the second value.

18. A tangible machine-readable medium comprising instructions that, when executed, cause a machine to at least:

train a machine learning (ML) model using a plurality of training data including a plurality of training customer data, a plurality of training cart occupancy values, a plurality of training point of sale (POS) capacity values, and a plurality of training customer checkout values;

capture image data of one or more customers and one or more carts;

analyze the image data to determine (i) a set of customer data indicative of a number of respective customers and (ii) a cart occupancy value associated with the respective customers, and to generate a visual embedding and a customer identification value corresponding to each customer;

generate, utilizing the trained ML model, a first value based on the set of customer data and the cart occupancy value associated with the respective customers;

determine whether the first value exceeds a second value; and responsive to determining that the first value exceeds the second value, generate, utilizing the trained ML model, an adjustment indicative of a number of POS stations to accommodate the number of respective customers and a confidence value associated with the adjustment, and generate an alert for transmission to a device indicating the first value exceeds the second value, indicating the adjustment, and indicating the confidence value associated with the adjustment.

19. The tangible machine-readable medium of claim 18, wherein the instructions, when executed, further cause the machine to analyze the image data by:

executing a machine vision algorithm configured to generate the visual embedding and the customer identification value corresponding to each customer; and storing the visual embedding and the customer identification value for each customer in a database.

20. The tangible machine-readable medium of claim 19, wherein the instructions, when executed, further cause the machine to:

generate the visual embedding and the customer identification value for a respective customer at a first time;

update the cart occupancy value for the respective customer at a second time that is different from the first time; and delete the visual embedding and the customer identification value for a respective customer at a third time, wherein the respective customer does not appear in subsequent image data at the third time, and the third time exceeds a threshold value relative to the second time.

* * * * *